Aug. 28, 1956  W. B. KIRK ET AL  2,760,831
SHAFT FASTENER
Filed March 25, 1952
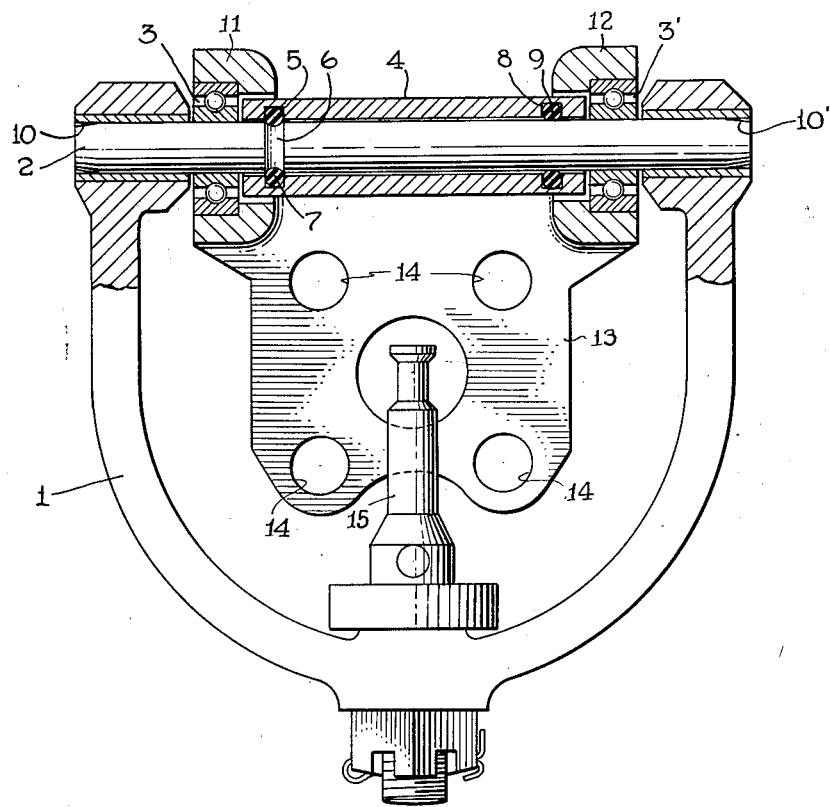
INVENTORS
Walter B. Kirk
William S. Johnston
Harold G. Fay
BY
Adelbert G. Steinmiller
ATTORNEY

United States Patent Office 2,760,831
Patented Aug. 28, 1956

2,760,831

SHAFT FASTENER

Walter B. Kirk, East McKeesport, William S. Johnston, Pittsburgh, and Harold G. Fay, Pitcairn, Pa., assignors to Westinghouse Air Brake Company, Wilmerding, Pa., a corporation of Pennsylvania Application March 25, 1952, Serial No. 278,518

2 Claims. (Cl. 308—1)

This invention relates to fasteners and more particularly to the type for holding a pin, shaft or the like against endwise movement relative to a part in which the pin is mounted.

In U. S. Patent No. 2,531,054 issued on November 21, 1950, to C. S. Kelley there is disclosed a rotary inertia device for use particularly on railway cars. This device embodies a substantially U-shaped lever the extremities of which are carried by a journaled pin secured to one of the extremities by a lock wire. There is a possibility that vibration and shock in a railway car may cause such a beating action between the journaled pin and wire as to cause premature failure of the wire. This would allow the pin to slip out of its intended position which could result in failure of the device as a whole.

The principal object of the invention is therefore the provision of improved means for securing a pin or the like, such as above described, in position.

Other objects and advantages of the invention will become apparent from the following more detailed description thereof.

In the accompanying drawing, the single figure is a plan view, partly in section, of a device embodying the invention.

As shown in the drawing, reference numeral 1 designates a substantially U-shaped lever the opposite extremities of which are provided with coaxially aligned bores in which there are mounted with a sliding fit the opposite ends, respectively, of a pin or shaft 2. The pin or shaft 2 is journaled in two anti-friction bearings 3, 3' disposed between and in proximity, respectively, to the extremities of lever 1. The bearings 3, 3' are coaxially supported in lugs 11 and 12, respectively, forming part of a bracket 13 for supporting the lever 1, said bracket being provided with a plurality of holes 14 through which screws (not shown) may be inserted for mounting said bracket to the end of a rotary shaft of a rotary inertia device, for example, such as disclosed in the above-mentioned Kelley patent. Though not deemed essential to an understanding of the invention and since reference may be had to the Kelley patent, it will suffice to merely mention that a cam shaft 15 is carried by the lever 1, said shaft being connected to a spring (not shown) for biasing it toward the bracket 13. As so far described, the structure may, merely for purposes of illustration, be substantially like that disclosed in the Kelley patent above referred to.

In order to hold the pin 2 properly assembled to lever 1, in a manner to be presently described, there is provided, according to the invention, a sleeve 4, separate from the bracket 13, through which said pin freely extends and which is disposed between the bearings 3, 3'. The opposite ends of sleeve 4 are slightly spaced from the adjacent sides of the respective bearings 3, 3' to avoid binding therebetween. With the pin 2 properly assembled in lever 1, as shown in the drawing, an internal annular groove 5 in and adjacent one end of sleeve 4 is aligned with an external annular groove 6 in said pin and contracted around said pin into the latter groove and extending into the former groove 5 is a resilient O shaped ring 7. Preferably, the ring 7 fills the groove 6 but has very slight clearance with the side walls of groove 5 to prevent any binding action therebetween. It will be seen that this ring 7 secures the sleeve 4 against axial movement on pin 2 and contact between one end or the other of said sleeve and one or the other of bearings 3, 3' will so limit endwise movement of pin 2 as to hold said pin in position for supporting lever 1 as intended. Further, when employed where there is severe shock and vibration, the ring 7, being resilient, will absorb such shock as may be created incident, for instance, to the sleeve 4 hammering against one or the other bearings 3, 3' and thus maintain the pin 2 in proper relation to lever 1.

Adjacent its opposite end the sleeve 4 is provided with an internal annular groove 8 in which there is mounted another resilient O shaped ring 9 which is contracted around and in contact with the peripheral surface of shaft 2 but not into a groove like groove 6 into which the ring 7 is contracted. The ring 9 acts to resiliently support on pin 2 the end of sleeve 4 opposite that carried by ring 7 to avoid hammering action and possible seizing between said sleeve and pin which might otherwise occur due to said sleeve vibrating against one of the bearings 3, 3'. The friction between ring 9 and pin 2 also acts to hold said pin and sleeve 4 against relative movement axially of one another.

By the use of sleeve 4 disposed between bearings 3, 3' and the ring 7 for securing said sleeve to the pin 2 it will be noted that the overall length of said pin and hence of the structure as a whole need be no greater than previously, this being very important for embodying the improvement in devices, such as disclosed in the above mentioned patent.

It will be noted that both ends of the pin 2 are tapered, as at 10, 10', to facilitate assembly of the device. In order to assemble the device the rings 7 and 9 will be positioned in the respective grooves 5 and 8 in sleeve 4. The sleeve 4 will then be mounted between the bearings 3, 3' and with one end of the pin 2 started in, preferably, the left hand end or extremity of lever 1 and lined up with bearing 3, said pin will be pressed through the latter bearing into the adjacent end of sleeve 4 and through said sleeve and the other bearing 3' into position in the other end of said lever. During such assembly, the tapered, leading end of the pin 2 will pass through and expand the ring 7 to permit said pin to pass on and through the ring 9, expanding same, until the groove 6 in the pin registers with ring 7 which will then snap into groove 6 for holding said pin against further movement and in which position it will be properly positioned for carrying lever 1.

Having now described our invention, what we claim as new and desire to secure by Letters Patent, is:

1. In a hinged connection between two relatively movable elements, which hinged connection has a pin adapted to be slidably inserted and removed longitudinally from coaxially aligned bores in the respective elements, means for securing said pin in proper position within said coaxially aligned bores of said elements comprising a sleeve member having a bore through which said pin extends, and which is held by said pin in coaxial alignment with and between two adjacent bores of said elements, a pair of internal annular grooves in and adjacent each end of said sleeve member, respectively, opening into the bore of said sleeve member, an annular groove in the outer surface of said pin so spaced from one end thereof as to register with one of said annular grooves in said sleeve member when the pin is entirely received within the bores of said elements, and a pair of O-rings of resilient material each contained in a corresponding one of the grooves in said sleeve member, one of which O-rings being adapted to snap into the annular groove in said pin upon axial insertion of the pin in the bores of said elements to yieldingly hold said pin against axial movement out of the bores of said elements, and both O-rings acting to center said sleeve member concentrically around said pin to prevent chattering contact thereof with said pin.

2. In combination, a U-shaped lever like element, a pin extending between and having its opposite ends mounted, with a sliding fit, in bores in the extremities of said element, a supporting bracket, two spaced apart bearings carried by said bracket between and in proximity to said extremities and through which the pin extends, a sleeve between said bearings and through which the pin extends, which sleeve has its opposite ends in proximity to adjacent faces of said bearings, two annular grooves in said sleeve, one adjacent each end thereof and open to the interior surface of said sleeve and two spaced apart resilient rings disposed, respectively, in said grooves in said sleeve and contracted around said pin with one engaging the peripheral surface of said pin for preventing hammering of the sleeve on said pin, and an annular groove in said pin receiving the other ring for holding said pin against axial movement relative to said sleeve.

References Cited in the file of this patent

UNITED STATES PATENTS

| | | |
|---|---|---|
| 1,736,972 | Hutchinson | Nov. 26, 1929 |
| 2,114,670 | Searles | Apr. 19, 1938 |
| 2,406,069 | Freeman | Aug. 20, 1946 |
| 2,453,391 | Whittingham | Nov. 9, 1948 |
| 2,473,267 | Wightman | June 14, 1949 |
| 2,531,054 | Kelley | Nov. 21, 1950 |